US011627395B2

(12) United States Patent
Jain et al.

(10) Patent No.: US 11,627,395 B2
(45) Date of Patent: Apr. 11, 2023

(54) APPARATUS AND METHODS FOR CANCELLING THE NOISE OF A SPEAKER FOR SPEECH RECOGNITION

(71) Applicant: Halonix Technologies Private Limited, Noida (IN)

(72) Inventors: Jinendra Jain, Noida (IN); Himanshu Rawat, Noida (IN)

(73) Assignee: Halonix Technologies Private Limited, Noida (IN)

( * ) Notice: Subject to any disclaimer, the term of this patent is extended or adjusted under 35 U.S.C. 154(b) by 0 days.

(21) Appl. No.: 17/402,711

(22) Filed: Aug. 16, 2021

(65) Prior Publication Data

US 2022/0353593 A1 Nov. 3, 2022

(30) Foreign Application Priority Data

Apr. 29, 2021 (IN) ............................ 202111019695

(51) Int. Cl.
*H04R 1/02* (2006.01)
*G10L 21/02* (2013.01)
(Continued)

(52) U.S. Cl.
CPC .......... *H04R 1/023* (2013.01); *G10L 21/0208* (2013.01); *H04R 1/025* (2013.01);
(Continued)

(58) Field of Classification Search
CPC . H04R 1/00; H04R 1/02; H04R 1/023; H04R 1/025; H04R 1/028; H04R 1/406; H04R 2410/03; G10L 21/02; G10L 21/0208; G10L 21/02082; G10L 2021/02166; G10K 11/16; G10K 11/175;
(Continued)

(56) References Cited

U.S. PATENT DOCUMENTS 8,629,618 B1 * 1/2014 Tanner .................. H05B 45/00 315/86
10,013,995 B1 * 7/2018 Lashkari .............. H04M 9/082
(Continued)

FOREIGN PATENT DOCUMENTS

CN 108870101 A 11/2018
CN 208638527 U * 3/2019
(Continued)

*Primary Examiner* — Thang V Tran
(74) *Attorney, Agent, or Firm* — David Postolski; Gearhart Law LLC

(57) ABSTRACT

The present disclosure relates to an apparatus for cancelling a noise signal for speech recognition, the apparatus includes one or more microphones configured on a mesh enclosure to receive a first set of signals pertaining to a user command. A speaker located in the mesh enclosure configured to generate a second set of signals pertaining to noise signal, wherein each of the one or more microphones are arranged perpendicular above the speaker at predefined degrees to cancel the generated second set of signals reaching the one or more microphones. A processor configured to process the received first set of signals by cancellation of the second set of signals; and enable, on receipt of the first set of signals, an operational mode of the apparatus to execute corresponding action.

10 Claims, 5 Drawing Sheets

(51) Int. Cl.
*G10L 21/0208* (2013.01)
*H04R 1/40* (2006.01)
*G10L 21/0216* (2013.01)

(52) U.S. Cl.
CPC ............. *H04R 1/028* (2013.01); *H04R 1/406* (2013.01); *G10L 2021/02166* (2013.01); *H04R 1/02* (2013.01); *H04R 2410/03* (2013.01)

(58) Field of Classification Search
CPC ........... G10K 11/1752; G10K 11/1754; G10K 11/178; G10K 11/1787
See application file for complete search history.

(56) References Cited

U.S. PATENT DOCUMENTS

| | | | | |
|---|---|---|---|---|
| 2009/0017878 | A1* | 1/2009 | Romesburg | H04R 3/02 455/570 |
| 2012/0070152 | A1* | 3/2012 | Preston | G09B 9/003 398/115 |
| 2014/0254829 | A1* | 9/2014 | Wang | H04R 3/12 381/105 |
| 2014/0354160 | A1* | 12/2014 | Aggarwal | H05B 47/12 315/312 |
| 2018/0177029 | A1 | 6/2018 | Wang | |
| 2019/0364360 | A1* | 11/2019 | Cho | G10L 15/22 |
| 2020/0304914 | A1* | 9/2020 | Mata Magana | F21V 33/0056 |

FOREIGN PATENT DOCUMENTS

| | | | | |
|---|---|---|---|---|
| CN | 110099328 A | | 8/2019 | |
| CN | 110660404 A | * | 1/2020 | G10L 21/0208 |
| GB | 2569300 A | | 6/2019 | |
| WO | WO-2018158558 A1 | * | 9/2018 | H04B 3/23 |

* cited by examiner

APPARATUS AND METHODS FOR CANCELLING THE NOISE OF A SPEAKER FOR SPEECH RECOGNITION

CROSS REFERENCE TO RELATED APPLICATIONS

This application is a non-provisional application, which claims priority to India Application 202111019695 filed Apr. 29, 2021, the contents of which is hereby fully incorporated by reference in its entirety.

TECHNICAL FIELD

The present disclosure relates, in general, to voice-controlled apparatus and more specifically, relates to an apparatus and methods for cancelling the sound noise of a speaker for speech recognition in a voice control enabled LED bulb.

BACKGROUND

Advances in technology have resulted in smaller and more powerful computing devices. For example, there currently exist a variety of portable computing devices that are small, lightweight, and easily carried by users. As these devices have become more sophisticated, new technologies have been developed to take advantage of the computing capabilities of these devices. For example, voice recognition technologies have been incorporated into portable computing devices. Voice recognition enables a user to provide input, such as a command or query, to a computing device by speaking to the computing device.

There are few devices such as smart speakers which work on far-field voice recognition, however, they use more than three microphones to achieve the same functionalities and the placement of the microphone are at 180 degrees to the speaker so that there is no direct sound noise to the microphones. The LED lamps that use voice recognition in the far-field environment face different challenges. For example, the signal-to-noise ratio (SNR) at the LED lamps may be significantly lower because the microphone of the LED lamps may be further from the user and/or closer to a noise source, which can make processing the voice input challenging.

Therefore, there is a need in the art to provide an apparatus to cancel the sound noise of a speaker for speech recognition in the voice control enabled LED bulb/lamp.

OBJECTS OF THE PRESENT DISCLOSURE

An object of the present disclosure relates, in general, to voice-controlled apparatus and more specifically, relates to an apparatus and methods for cancelling the sound noise of a speaker for speech recognition in a voice control enabled LED bulb.

Another object of the present disclosure provides an apparatus that can be effectively controlled by voice commands.

Another object of the present disclosure provides an apparatus that can cancel the noise signal of a speaker for speech recognition.

Another object of the present disclosure provides an apparatus that can improve the ease and convenience of the user.

Another object of the present disclosure provides an apparatus that can control the operational mode of the LED bulb, without physically interacting with a switch.

Another object of the present disclosure provides an apparatus that can control multiple possible operational modes of the LED lamp using verbal commands.

Yet another object of the present disclosure provides an apparatus that require less hardware components.

SUMMARY

The present disclosure relates, in general, to voice-controlled apparatus and more specifically, relates to an apparatus and methods for cancelling the sound noise of a speaker for speech recognition in a voice control enabled LED bulb. The present disclosure enables far-field voice control in a LED bulb while mechanically cancelling the sound noise. The wake word to enable the apparatus to listening mode needs to be clearly identified by the voice processor/voice processing unit even in the sound noise. Three MEMS microphones are placed at the top, 120 degrees apart perpendicular to the speaker output, for recognizing the wake word. The three microphones can listen to the user from 3 meters in 360 degrees and the voice processing unit processes the command for action.

In an aspect, the present disclosure provides an apparatus for cancelling a noise signal for speech recognition, the apparatus including one or more microphones configured on a mesh enclosure of the apparatus, the one or more microphones configured to receive a first set of signals, the first set of signals pertaining to a user command, a speaker located in the mesh enclosure of the apparatus, the speaker, upon operation, configured to generate a second set of signals, the second set of signals pertaining to noise signal, wherein each of the one or more microphones are arranged perpendicular above the speaker at predefined degrees to cancel the generated second set of signals reaching the one or more microphones; and a processor operatively coupled to the one or more microphones and the speaker, the processor configured to receive, from the one or more microprocessors, the first set of signals; process the received first set of signals by cancellation of the second set of signals; and enable, on receipt of the first set of signals, an operational mode of the apparatus to execute corresponding action.

In an embodiment, the one or more microphones can include three micro-electromechanical systems (MEMS) digital microphones that are placed at 120 degrees apart from each other in the mesh enclosure for better voice reception.

In another embodiment, the apparatus can be a LED lamp.

In another embodiment, the mesh enclosure can be a combination of circular ring shape.

In another embodiment, output vents of the mesh enclosure for the speaker can be configured at 60 degrees away from the one or more microphones to reduce the noise signal reaching the one or more microphones, wherein the one or more microphones are enabled to differentiate between the noise signal and the user command.

In another embodiment, the one or more microphones can be isolated from the speaker by employing sponge and sealant.

In another embodiment, the sponge configured between the different parts of the LED lamp to suppress the vibrations produced when the speaker in the LED lamp is in an operational mode.

In another embodiment, the user command is a voice input spoken by the user in a far-field environment.

In another embodiment, the processor, on receipt of the user command, configured to control the operational mode of the LED lamp to any or a combination of activation state or deactivation state.

In an aspect, the present disclosure provides a method for cancelling a noise signal for speech recognition, the method including receiving, at a computing device, from one or more microprocessors, a first set of signals, the one or more microphones configured on a mesh enclosure of the apparatus, the one or more microphones configured to receive the first set of signals, the first set of signals pertaining to a user command, processing, at the computing device, the received first set of signals by cancellation of a second set of signals, the speaker located in the mesh enclosure of the apparatus, the speaker, upon operation, configured to generate the second set of signals, the second set of signals pertaining to noise signal, wherein each of the one or more microphones are arranged perpendicular above the speaker at predefined degrees to cancel the generated second set of signals reaching the one or more microphones; and enabling, at the computing device, on receipt of the first set of signals, an operational mode of the apparatus to execute corresponding action.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The following drawings form part of the present specification and are included to further illustrate aspects of the present disclosure. The disclosure may be better understood by reference to the drawings in combination with the detailed description of the specific embodiments presented herein.

DETAILED DESCRIPTION

The following is a detailed description of embodiments of the disclosure depicted in the accompanying drawings. The embodiments are in such detail as to clearly communicate the disclosure. If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The present disclosure relates, in general, to voice-controlled apparatus and more specifically, relates to an apparatus and methods for cancelling the sound noise of a speaker for speech recognition in a voice control enabled LED bulb. The present disclosure enables far-field voice control in a LED bulb while mechanically cancelling the sound noise. The wake word to enable the apparatus to listening mode needs to be clearly identified by the voice processor/voice processing unit even in the sound noise. Three MEMS microphones are placed at the top, 120 degrees apart perpendicular to the speaker output, for recognizing the wake word. The three microphones can listen to the user from 3 meters in 360 degrees and the voice processing unit processes the command for action.

The present disclosure provides the three microphones and speakers that are so placed to cancel the sound noise to enable the apparatus into listening mode. When the three microphones are placed perpendicular at the top of the speaker, the sound from the speaker may add direct noise to the three microphones from taking the inputs from the user. Sponge between the different parts of the lamp can be used to suppress the vibrations produced in it when the in-built speaker in the lamp is in operation. Microphones are isolated from the speaker part by using the proper sponge and sealant. The present disclosure can be described in enabling detail in the following examples, which may represent more than one embodiment of the present disclosure.

Figure 1A:
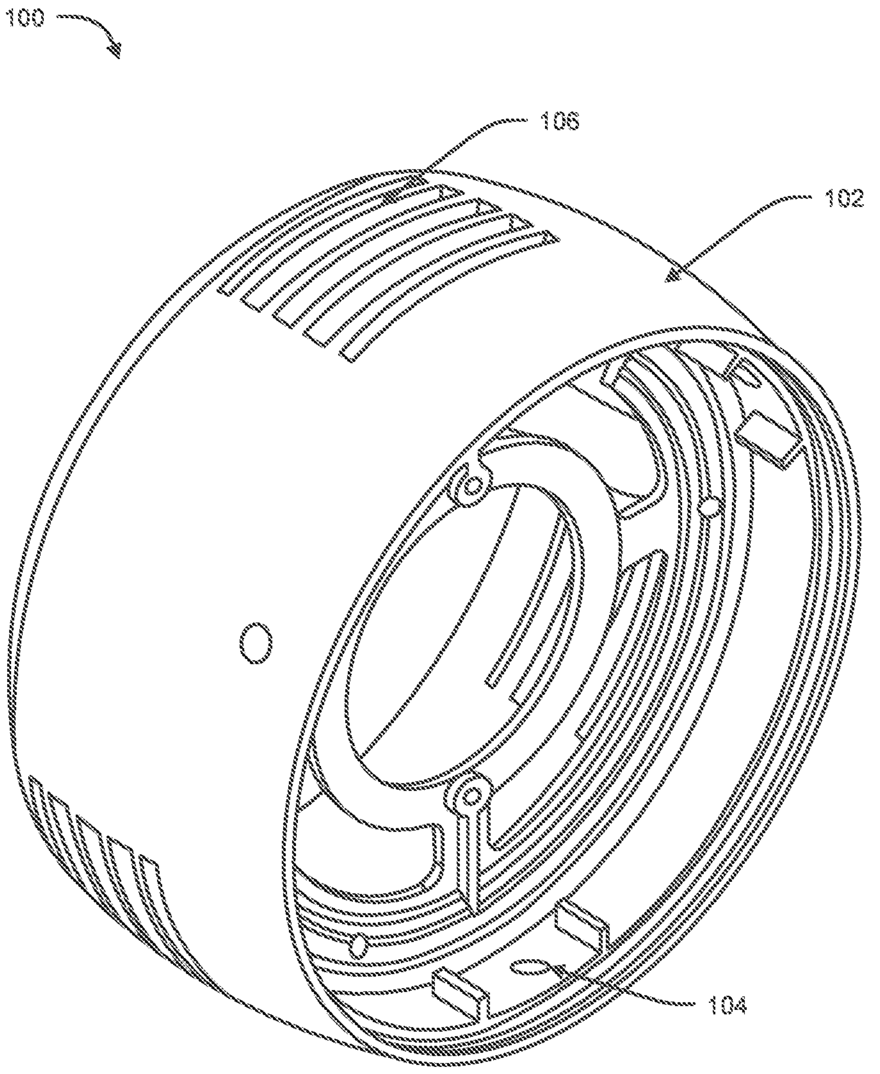
FIG. 1A illustrates an exemplary representation of an apparatus for cancelling a noise signal for speech recognition, in accordance with an embodiment of the present disclosure.

FIG. 1A illustrates an exemplary representation of an apparatus for cancelling a noise signal for speech recognition, in accordance with an embodiment of the present disclosure.

Figure 1B:
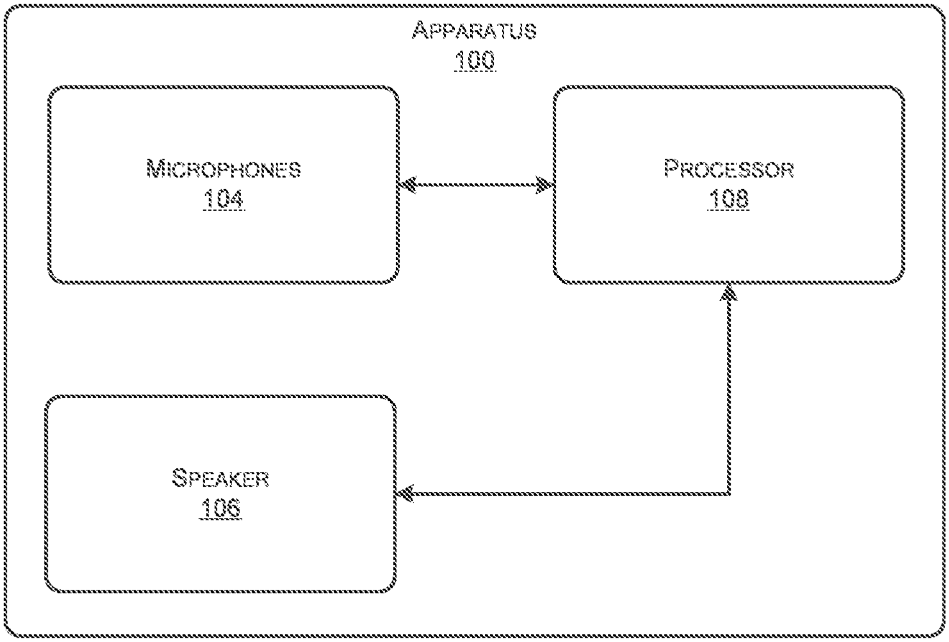
FIG. 1B illustrates an exemplary functional component of an apparatus for speech recognition, in accordance with an embodiment of the present disclosure.

Referring to FIG. 1A, an apparatus 100 can be configured to obtain noise-free and echo-free far-field voice command. The apparatus 100 as presented in the example is a light-emitting diode (LED) lamp/bulb 100. As can be appreciated, the present disclosure may not be limited to this configuration but may be extended to other configurations. The apparatus 100 can include a mesh enclosure 102 (also interchangeably referred to as mesh ring 102), which can incorporate one or more microphones 104, a processor 108 (as illustrated in FIG. 1B and described in detail below) and a speaker 106. The mesh enclosure 102 is a combination of circular ring shape. The present disclosure enables far-field voice control in the LED lamp while mechanically cancelling the interference i.e., sound noise that is caused when the speaker is playing news or music and the noise around the one or more microphones 104 is maximum.

Generally, as used herein, the term "far-field environment" refers to any location or environment that is distant from the use of a considered product. The wake word is received to enable the apparatus 100 to listening mode needs to be clearly identified by the processor i.e., voice processor even in the noisy environment, e.g., when the speaker is playing the news or music, the noise around one or more microphones can be maximum.

FIG. 1B illustrates an exemplary functional component of an apparatus for speech recognition, in accordance with an embodiment of the present disclosure. The one or more microphones 104 configured on the mesh enclosure 102 of the apparatus 100, the one or more microphones 104 configured to receive a first set of signals, where the first set of signals pertaining to a user command. The user command is a voice input spoken by the user in the far-field environment.

Figure 1C:
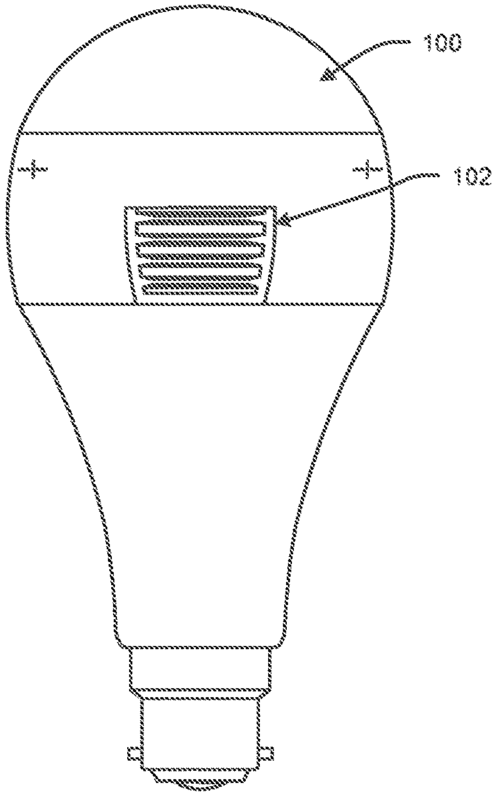
FIG. 1C illustrates an exemplary front view of a LED lamp, in accordance with an embodiment of the present disclosure.
Figure 1D:
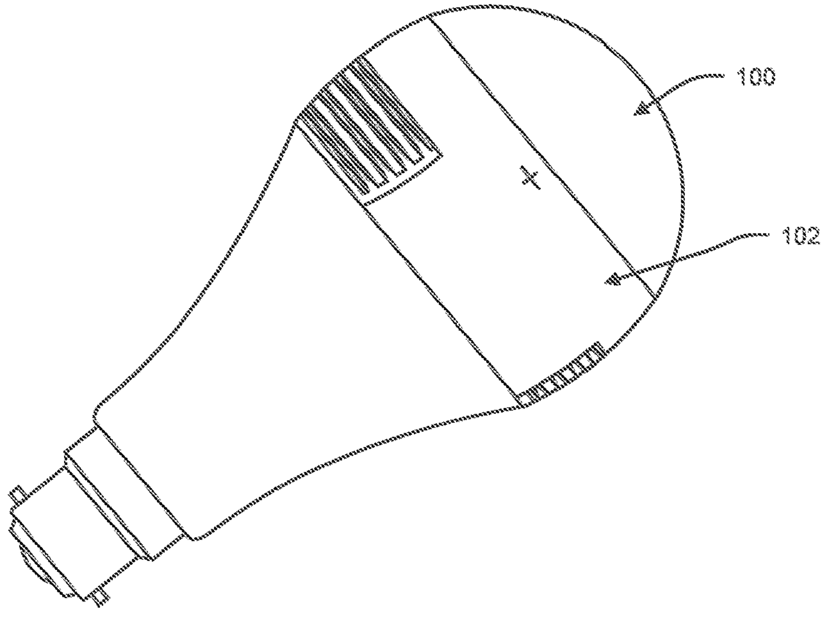
FIG. 1D illustrates a side view of the LED lamp, in accordance with an embodiment of the present disclosure.

In an exemplary embodiment, the one or more microphones 104 are three micro-electromechanical systems (MEMS) digital microphones. Each of the three MEMS digital microphones can be placed at 120 degrees apart from each other above a middle portion for better voice reception in the LED lamp 100. The front view and side view of the LED lamp 100 as illustrated in FIG. 1C and FIG. 1D respectively.

The speaker 106 located in the mesh enclosure 102 of the apparatus 100, the speaker, upon operation, configured to generate a second set of signals, the second set of signals pertaining to noise signal e.g., news or music. Each of the one or more microphones 104 are arranged perpendicular above the speaker 106 at predefined degrees to cancel the generated second set of signals reaching the one or more microphones 104, where the one or more microphones 104 can enable the apparatus 100 to listening mode. The predefined degrees can include the placement of one or more microphones 104 at 120 degrees and output vent for the speaker 106 are configured at 60 degrees away from the one or more microphones 104. The output vent of the mesh enclosure 102 for the speaker 106 are configured at 60 degrees away from the one or more microphones 104 to reduce the noise signal reaching the one or more microphones 104, where the one or more microphones 104 are enabled to differentiate between the noise signal and the user command.

For example, a separate part is developed which works as a mesh for the speaker output and used for microphones placement. The one or more microphones 104 are placed perpendicular to the speaker output in the mesh ring 102 and the output vents of the mesh ring 102 for speaker are open at 60 degrees to the one or more microphones 104. This helps in cancelling the direct sound noise to the one or more microphones 104. When the one or more microphones 104 are placed perpendicular to the speaker 106 at the top the sound from the speaker 106 can act as noise to the one or more microphones 104 and can add direct noise to the one or more microphones 104 which in turn restricts the one or more microphones 104 to listen to the user voice or may not differentiate between speaker sound and human voice. To avoid the same the sound from the speaker 106 is kept at 60 degrees away from the one or more microphones 104 vent hold to reduce the direct sound noise to one or more microphones 104 and enabling them to differentiate between sound noise and human voice. This helped the product to achieve the far-field voice recognition in the LED bulb.

In another embodiment, the processor 108 coupled to the one or more microphones 104, the processor configured to receive, from the one or more microprocessors, the first set of signals. The processor 108 can process the received first set of signals by cancellation of the second set of signals. The processor 108 can enable, on receipt of the first set of signals, an operational mode of the apparatus 100 to execute corresponding action. The processor 108, on receipt of user command, configured to control the operational mode of the LED lamp to any or a combination of activation state or deactivation state.

The processor 108 also interchangeably referred to as voice processing unit 108 may correspond to one or multiple microprocessors that are contained within the mesh enclosure 102 of the LED lamp 100. The processor 108 may comprise a central processing unit (CPU) on a single integrated circuit (IC) or a few IC chips. The processor 108 may be a multipurpose, programmable device that accepts digital data as input, processes the digital data according to instructions stored in its internal memory, and provides results as output. The processor may implement sequential digital logic as it has internal memory.

For example, the three MEMS digital microphones 104 are placed at top, 120 degrees apart perpendicular to the speaker output, for recognizing the wake word. The three MEMS digital microphones 104 can listen to the user from 3 meters in 360 degrees and the processor 108 can process the user command for action. By the placement of the three microphones perpendicular to the speaker i.e., internal speaker at predefined degrees, the noise signal from the speaker can be suppressed/cancelled. The processor 108 may process the first set of signals using noise cancellation, or other operations. The processor 108 is configured to control the operational modes of the LED lamp to activate or deactivate the LED lamp. The other features of the LED lamp can also be controlled.

In another embodiment, the sponge is located between the different parts of the LED lamp to suppress the vibrations produced when the speaker 106 in the LED lamp 100 is in operational state. The one or more microphones 104 can be isolated from the speaker 106 by using proper sponge and sealant.

The embodiments of the present disclosure described above provide several advantages. One or more of the embodiments provides the apparatus 100 that can be effectively controlled by voice commands. The apparatus 100 can cancel the noise signal of the speaker for speech recognition. The present disclosure improves the ease and convenience of the user. The apparatus 100 can control the operational mode of the LED bulb, without physically interacting with a switch. The apparatus 100 can control multiple possible operational modes of the LED lamp using verbal commands, and require less hardware components to design.

Figure 2:
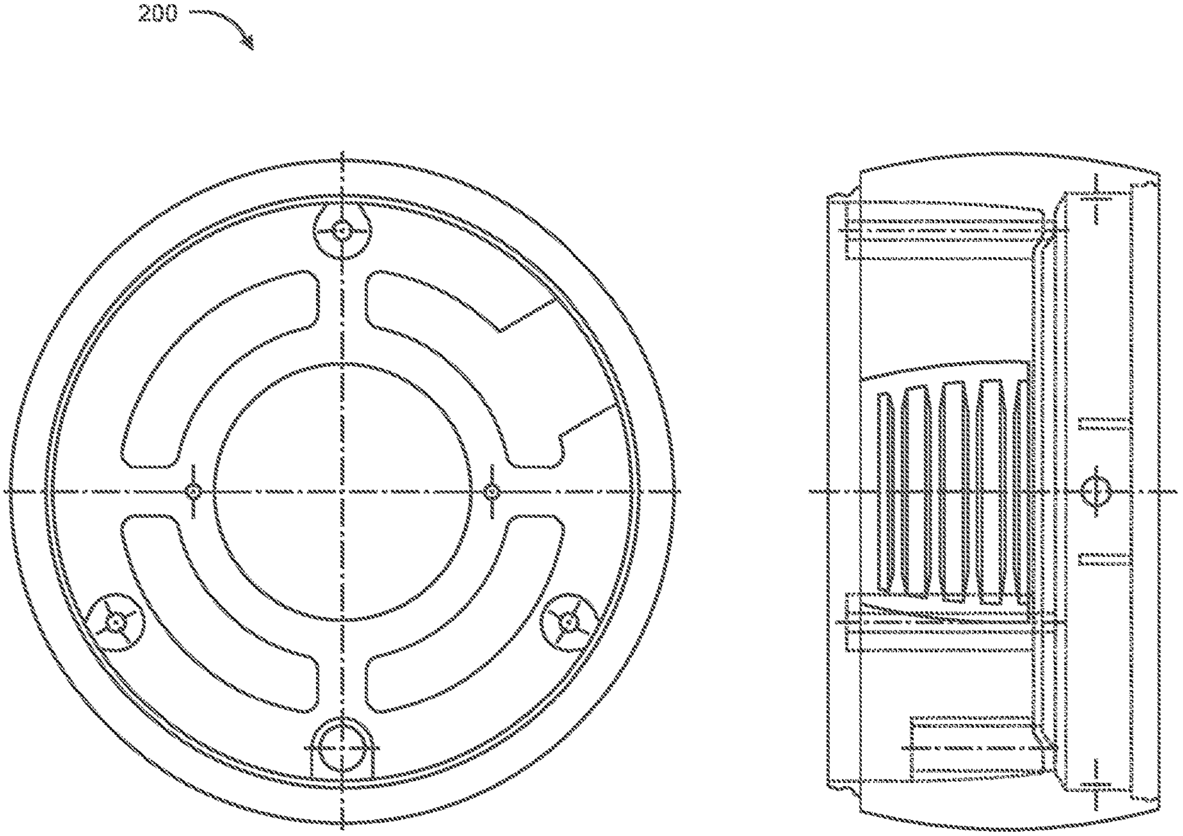
FIG. 2 illustrates an exemplary sectional view of the apparatus, in accordance with an embodiment of the present disclosure.

FIG. 2 illustrates an exemplary sectional view 200 of the apparatus, in accordance with an embodiment of the present disclosure.

As shown in FIG. 2, the three MEMS digital microphones 104 can be placed at 120 degrees above middle part developed for better voice reception in the LED lamp 100. The one or more microphones 104 can be placed perpendicular to the output of the speaker 106 in the mesh ring and the output vents of the mesh ring for speaker are open at 60 degrees to the one or more microphones 104. This helps in cancelling the direct sound noise to the one or more microphones 104. The output vent of the mesh enclosure for the speaker is kept 60 degrees away from the one or more microphones 104 vent hold to reduce the direct sound noise to one or more microphones 104 and enabling them to differentiate between sound noise and human voice, thereby enable the apparatus 100 to achieve the far field voice recognition in the LED bulb 100.

In an example implementation, each microphone of one or more microphones 104 may be configured to receive the voice input from the user in the far-field environment as detected at one or more microphones 104. The voice input may include the command to execute a function of the apparatus 100 and may cause the apparatus 100 to execute the function. The command may include, for example, to turn on the light or turn off the light. By the placement of the three microphones 104 to the speaker 106, the noise signal from the speaker 106 can be suppressed/cancelled. The wake word is received to enable the apparatus 100 to listening mode needs to be identified by the processor 108 even in the noisy environment when the speaker 106 is playing the news or music.

Figure 3:
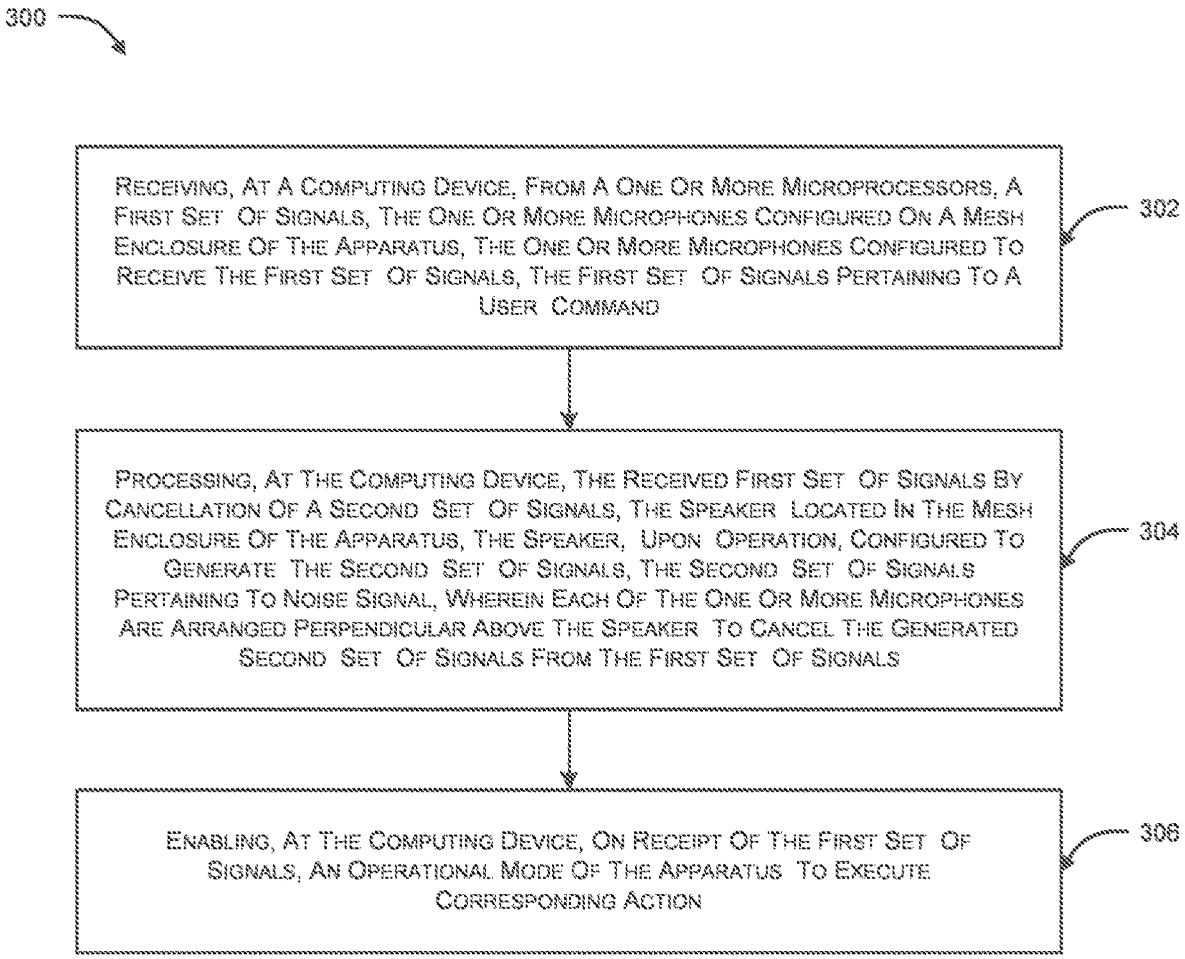
FIG. 3 illustrates an exemplary method for cancelling a noise signal for speech recognition, in accordance with an embodiment of the present disclosure.

FIG. 3 illustrates an exemplary method for cancelling a noise signal for speech recognition, in accordance with an embodiment of the present disclosure.

The method 300 can be implemented using a computing device, which can include one or more processors. At block 302, the computing device with the processor 108 can receive the first set of signals from the one or more microphones 104 that is configured on a mesh enclosure of the apparatus 100, the one or more microphones 104 configured to receive the first set of signals, where the first set of signals pertaining to a user command.

At block 304, the computing device 108 process the received first set of signals by cancellation of a second set of signals, the speaker 106 located in the mesh enclosure 102 of the apparatus, the speaker 106, upon operation, configured to generate the second set of signals, the second set of signals pertaining to noise signal. Each of the one or more microphones 104 are arranged perpendicular above the speaker 106 at predefined degrees to cancel the generated second set of signals reaching the one or more microphones 104.

At block 306, the computing device can enable, on receipt of the first set of signals, an operational mode of the apparatus 100 to execute corresponding action.

It will be apparent to those skilled in the art that the apparatus 100 of the disclosure may be provided using some or all of the mentioned features and components without departing from the scope of the present disclosure. While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the scope of the disclosure, as described in the claims.

Advantages of the Present Disclosure

The present disclosure provides an apparatus that can be effectively controlled by voice commands.

The present disclosure provides an apparatus that can cancel the noise signal of a speaker for speech recognition.

The present disclosure provides an apparatus that can improve the ease and convenience of the user.

The present disclosure provides an apparatus that can control the operational mode of the LED bulb, without physically interacting with a switch.

The present disclosure provides an apparatus that can control multiple possible operational modes of the LED lamp using verbal commands, The present disclosure provides an apparatus that require less hardware components.

We claim:

1. An apparatus (100) for cancelling a noise signal for speech recognition, the apparatus comprising:

one or more microphones (104) configured on a mesh enclosure (102) of the apparatus, the one or more microphones configured to receive a first set of signals, the first set of signals pertaining to a user command;

a speaker (106) located in the mesh enclosure of the apparatus, the speaker, upon operation, configured to generate a second set of signals, the second set of signals pertaining to noise signal, wherein each of the one or more microphones (104) are arranged perpendicular above the speaker (104) at predefined degrees to cancel the generated second set of signals reaching the one or more microphones (104); and a processor (108) operatively coupled to the one or more microphones and the speaker, the processor configured to:

receive, from the one or more microphones (104), the first set of signals;

process the received first set of signals by cancellation of the second set of signals; and enable, on receipt of the first set of signals, an operational mode of the apparatus (100) to execute corresponding action.

2. The apparatus as claimed in claim 1, wherein the one or more microphones (104) comprise three micro-electro-mechanical systems (MEMS) digital microphones that are placed at 120 degrees apart from each other in the mesh enclosure for better voice reception.

3. The apparatus as claimed in claim 1, wherein the apparatus (100) is a LED lamp.

4. The apparatus as claimed in claim 1, wherein the mesh enclosure (102) is a combination of circular ring shape.

5. The apparatus as claimed in claim 4, wherein output vents of the mesh enclosure (102) for the speaker (106) are configured at 60 degrees away from the one or more microphones (104) to reduce the noise signal reaching the one or more microphones (104), wherein the one or more microphones (104) are enabled to differentiate between the noise signal and the user command.

6. The apparatus as claimed in claim 1, wherein the one or more microphones (104) are isolated from the speaker by employing sponge and sealant.

7. The apparatus as claimed in claim 6, wherein the apparatus (100) is a LED lamp, wherein the sponge is configured between the different parts of the LED lamp to suppress the vibrations produced when the speaker in the LED lamp is in an operational mode.

8. The apparatus as claimed in claim 1, wherein the user command is a voice input spoken by the user in a far-field environment.

9. The apparatus as claimed in claim 1, wherein the apparatus (100) is a LED lamp, wherein the processor (108), on receipt of user command, configured to control the operational mode of the LED lamp to any or a combination of activation state or deactivation state.

10. A method (300) for cancelling a noise signal for speech recognition, the method comprising:

receiving (302), at a computing device, from one or more microphones, a first set of signals, the one or more microphones configured on a mesh enclosure of the apparatus, the one or more microphones configured to receive the first set of signals, the first set of signals pertaining to a user command;

processing (304), at the computing device, the received first set of signals by cancellation of a second set of signals, a speaker, upon operation, configured to generate the second set of signals, the second set of signals pertaining to noise signal, the speaker located in the mesh enclosure of the apparatus;

wherein each of the one or more microphones are arranged perpendicular above the speaker at predefined degrees to cancel the generated second set of signals reaching the one or more microphones;

enabling (306), at the computing device, on receipt of the first set of signals, an operational mode of the apparatus to execute corresponding action.

* * * * *